(12) United States Patent
Mullin et al.

(10) Patent No.: US 6,726,320 B1
(45) Date of Patent: Apr. 27, 2004

(54) INTEGRATED READING LENSES FOR SUNGLASSES

(76) Inventors: Bill Mullin, 352 Emerald Dr., Arnolds Park, IA (US) 51331; Patricia McGill, 352 Emerald Dr., Arnolds Park, IA (US) 51331

( * ) Notice: Subject to any disclaimer, the term of this patent is extended or adjusted under 35 U.S.C. 154(b) by 0 days.

(21) Appl. No.: 10/348,593

(22) Filed: Jan. 21, 2003

(51) Int. Cl.[7] .................................................. G02C 7/10
(52) U.S. Cl. ........................................ 351/44; 351/163
(58) Field of Search .............................. 351/41, 44, 45, 351/49, 163

(56) References Cited

U.S. PATENT DOCUMENTS

| | | | |
|---|---|---|---|
| 4,451,127 A | 5/1984 | Moffitt, Jr. | |
| 4,991,849 A | 2/1991 | Fabanich | |
| 5,189,445 A | 2/1993 | Stagner | |
| 5,349,393 A | 9/1994 | Kreft | |
| 5,381,193 A * | 1/1995 | Wedding | 351/163 |
| 5,478,824 A | 12/1995 | Burns et al. | |
| 5,625,427 A * | 4/1997 | Araujo et al. | 351/159 |
| 5,642,177 A | 6/1997 | Nishioka | |
| 5,682,220 A | 10/1997 | Sherman et al. | |
| 5,729,381 A * | 3/1998 | Havens et al. | 359/361 |
| 5,793,467 A | 8/1998 | Bailey | |
| 5,973,865 A * | 10/1999 | Havens et al. | 359/885 |
| 5,975,695 A * | 11/1999 | Baiocchi et al. | 351/163 |
| 6,003,990 A | 12/1999 | Einhorn | |
| 6,170,952 B1 | 1/2001 | La Haye et al. | |
| 2002/0135735 A1 * | 9/2002 | Yamamoto et al. | 351/163 |
| 2003/0193643 A1 * | 10/2003 | Pratt | 351/44 |

* cited by examiner

*Primary Examiner*—Scott J. Sugarman
*Assistant Examiner*—Darryl J. Collins
(74) *Attorney, Agent, or Firm*—Dale J. Ream

(57) ABSTRACT

A reading lens to be held by the lens frame of sunglasses includes a transparent optical element, at least a portion of which includes a predetermined vision corrective light-refracting curvature. The optical element includes a glass or plastic construction having a spectral filter for allowing passage of a predetermined spectrum of light wavelengths therethrough to optimize viewing in a sunlit environment. The optical element includes a polarized filter for inhibiting light reflected from horizontal surfaces and includes an anti-reflective coating. The optical element includes a light transmission ratio that blocks a predetermined quantity of sunlights e.g. a tint for reducing sunlight intensity. The light transmission ratio may be constant throughout the optical element or may have a gradient distribution.

20 Claims, 4 Drawing Sheets

INTEGRATED READING LENSES FOR SUNGLASSES

BACKGROUND OF THE INVENTION

This invention relates generally to lenses with optical filters and, more particularly, to a reading lens for providing vision-corrective magnification while filtering impinging light according to a predetermined spectrum and inhibiting predetermined glare characteristics.

Many people require some type of magnification in order to read clearly. Rather than purchasing prescription lenses, some people choose to obtain generic reading glasses, commonly referred to as "readers". The mass production of lenses for readers makes them very affordable. However, readers are less effective when utilized in outdoor environments, particularly in intense sunlight due to glare, reflections, and wavelengths of light that are not conducive to reading.

Various filters have been proposed in the art for regulating the passage of predetermined wavelengths of light through an optical medium. Although assumably effective for their intended purposes, the existing devices do not provide vision-corrective refraction along with spectral filtration of wavelengths not conducive to reading. Further, existing readers do not provide eye protection means including tinting, a polarized filter, and an anti-reflective coating.

Therefore, it is desirable to have a reading lens to be held by a sunglasses lens frame which includes at least a portion having a vision corrective light-refracting curvature. Further, it is desirable to have a reading lens which includes a spectral filter for inhibiting wavelengths of light that are not optimally conducive to reading. In addition, it is desirable to have a reading lens that includes a polarized filter and an anti-reflection coating to reduce disadvantageous glare characteristics encountered in outdoor sunlit environments.

SUMMARY OF THE INVENTION

A reading lens for blocking predetermined wavelengths and glare characteristics of light that are not conducive to reading in a sunlit environment includes a substantially transparent optical element, at least a portion of which includes a predetermined light-refracting curvature. This refractive curvature provides magnification of images viewed through the optical element. The optical element is adapted to be mounted within the lens frame of a pair of sunglasses. Further, the optical element includes a spectral filter for allowing predetermined percentages of particular wavelengths of light to pass therethrough. For example, only enough of the wavelength of light associated with the color blue is allowed to pass so as to maintain color identification. This is in recognition that blue light has the shortest wavelength and is prone to scattering, which reduces visual sharpness. The reading lens further includes a particular amount and distribution of tinting according to a predetermined light transmission ratio and includes a polarized filter and anti-reflection coating, whereby to minimize eye strain or damage.

Therefore, a general object of this invention is to provide a reading lens for magnifying an image viewed therethrough and to minimize wavelengths and glare characteristics that are not conducive to reading.

Another object of this invention is to provide a reading lens, as aforesaid, having a light transmission ratio that blocks a predetermined percentage of impinging light so as to reduce sunlight intensity.

Still another object of this invention is to provide a reading lens, as aforesaid, that blocks all ultraviolet light wavelengths.

Yet another object of this invention is to provide a reading lens, as aforesaid, having a polarized filter to block light reflecting off of horizontal surfaces.

A further object of this invention is to provide a reading lens, as aforesaid, having an anti-reflective coating to inhibit reflection of light by an inner surface of the lens.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
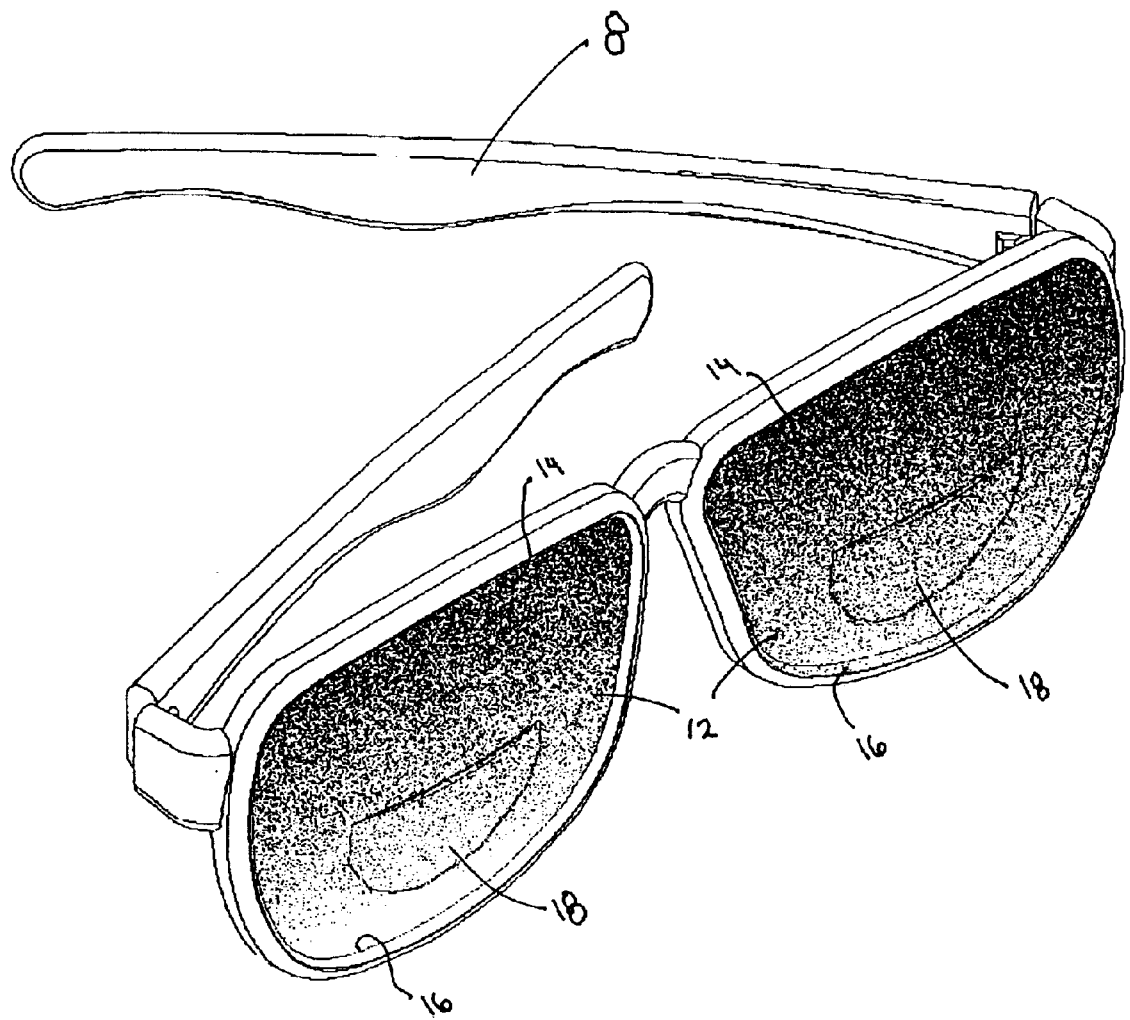
FIG. 1 is a perspective view a pair of reading lenses according to one embodiment of the present invention situated in a sunglasses frame.

A reading lens according to the present invention will now be described in detail with reference to FIGS. 1 through 4 of the accompanying drawings. A pair of reading lenses 10 according to one embodiment of the present invention is shown in FIG. 1 and includes a substantially transparent optical element 12 (FIG. 4) that may be mounted in the lens frame of a pair of sunglasses 8. The lenses are constructed of a durable transparent plastic material although a glass construction would also be suitable. Each lens 10 is tinted so as to exhibit a light transmission ratio of between about 16% to 40%, preferably about 24%. This level of tint significantly reduces the intensity of sunlight allowed to pass through the lens 10 and, therefore, reduces the risk of eyestrain caused by squinting in a bright environment. Obviously, a transmission ratio of 16% presents a very dark lens while a lens having a 40% transmission ratio is much lighter.

Figure 2:
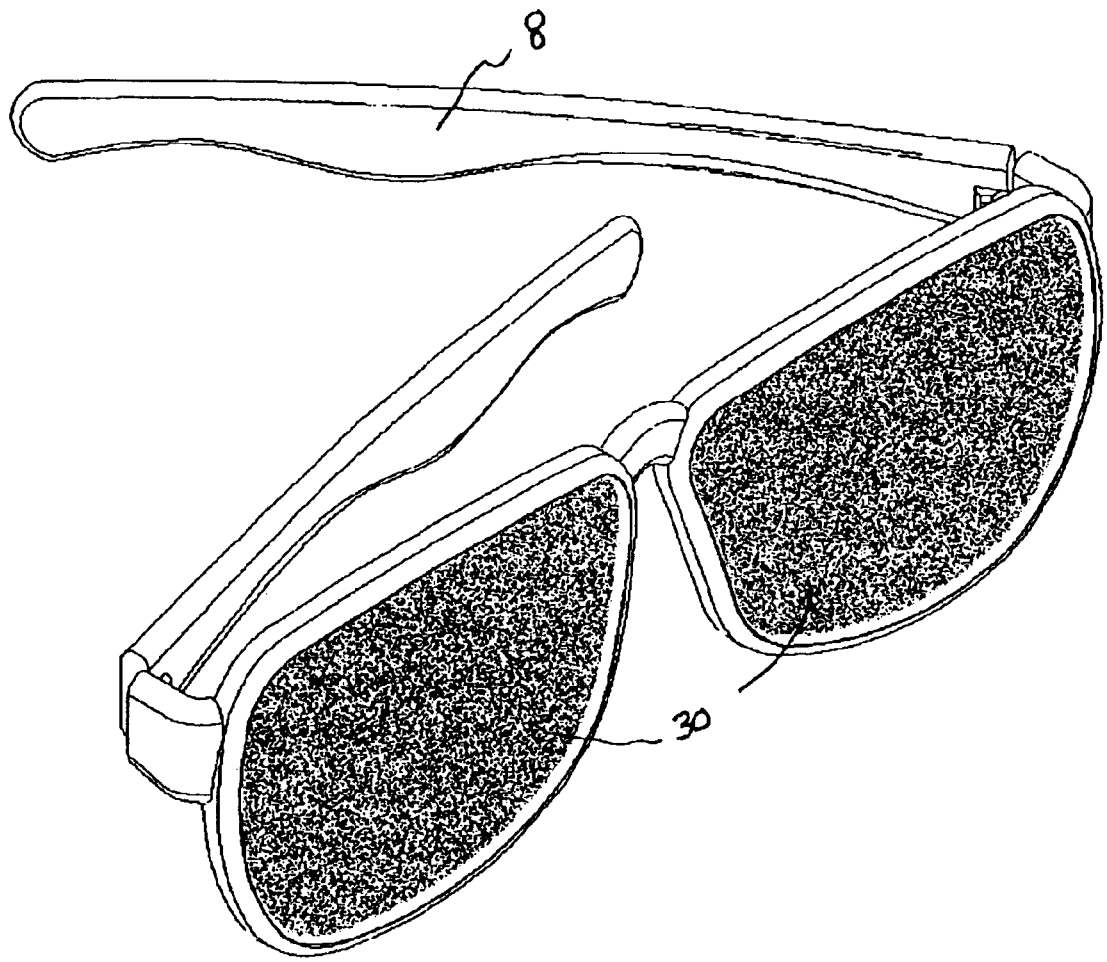
FIG. 2 is a perspective view of a pair of reading lenses according to another embodiment of the present invention situated in a sunglasses frame.

In the embodiment shown in FIG. 1, the tinting is applied in a gradient distribution. In other words, the tinting of the lens 10 is greater (and a greater amount of impinging light is blocked) adjacent an upper edge 14 of the optical element 12 than adjacent a lower edge 16 thereof. This distribution enables a user to read through the lower portion of each lens 10 while the upper portion thereof substantially blocks out other extraneous light. In another embodiment of the invention, however, the transmission ratio is constant throughout the lens 30 (FIG. 2).

At least a portion of the optical element of each lens 10 includes a vision corrective light-refracting curvature. More particularly, each optical element 12 includes a magnification portion 18 having a generally hemispherical configuration situated from the middle of each lens and extending downwardly toward the lower edge 16 of the optical element 12 (FIG. 1). Accordingly, images viewed by a user through the magnification portions are refracted so as to be magnified for enhanced readability. The refracting curvature may include a construction to yield a diopter of between 1.00 and about 5.00 although readers with a diopter of no greater than 4.00 would satisfy most of the market for readers. In other words, a magnification portion 18 that defines a diopter of 1.00 presents a lesser degree of magnification than a magnification portion 18 with a diopter of 2.00, and so on. The diopter corresponds to and is a measure of the degree of refraction and, therefore, the power of the lens. It should be appreciated that the magnification portions 18 are situated where the gradient distribution of tint is lighter. Where only a portion of each lens 10 includes a magnification curvature, the lenses operate as bifocals. In other words, the non-magnification portion is merely transparent with no light refraction.

Figure 3:
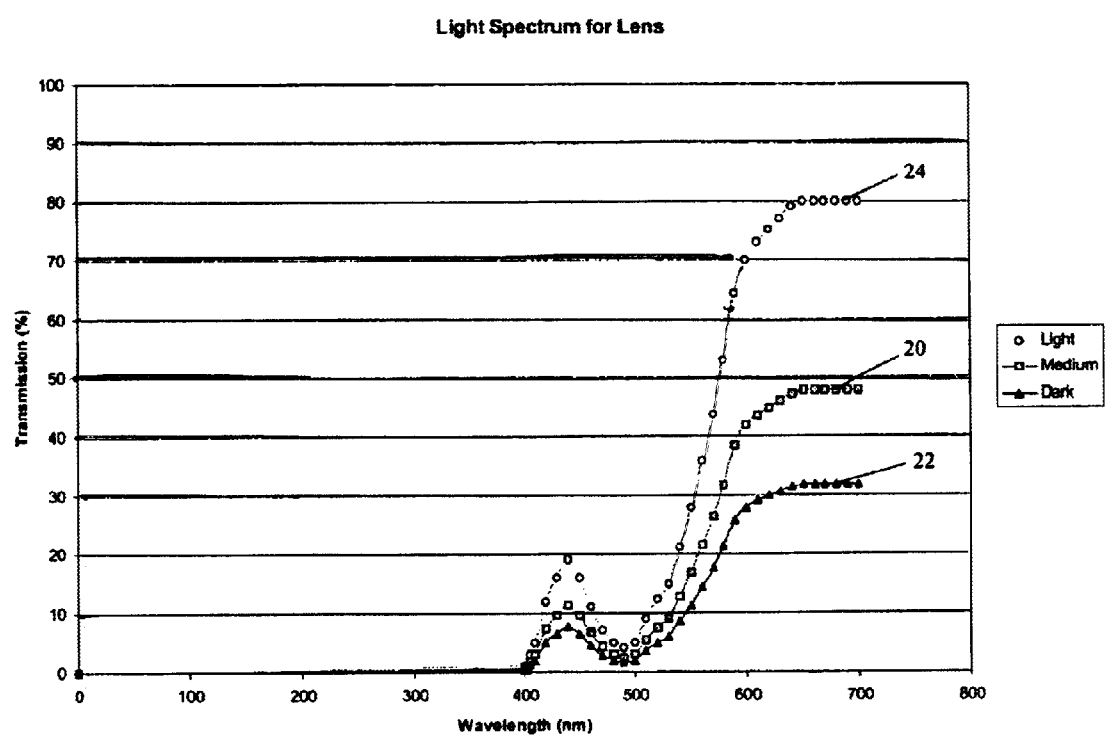
FIG. 3 is a graph of spectral transmission curves according to three alternative embodiments of the present invention.

Further, the optical element 12 includes a spectral filter which filters impinging light according to the spectral transmission curve shown in FIG. 3. The three curves differ only by scaling according to the light transmission ratio of the lens as described previously, but otherwise filter light wavelengths according to the same proportions. The spectral transmission curve identified by reference numeral 20 is preferred in that it corresponds to the preferred 24% light transmission ratio. This curve 20 is characterized by the following data points in FIG. 3:

| Light Wavelength (nm) | % Light Transmitted |
| --- | --- |
| below 400 | 0 |
| 400 | 1 |
| 410 | 3 |
| 420 | 7 |
| 430 | 10 |
| 440 | 11 |
| 460 | 7 |
| 470 | 4 |
| 500 | 3 |
| 520 | 7 |
| 540 | 13 |
| 560 | 22 |
| 600 | 42 |
| 650 | 48 |
| 700 | 48 |

The curve identified by reference numeral 22 filters light in the same spectral proportions but according to an overall light transmission ratio of only 16%. This very dark lens would be appropriate for use in the brightest sunlight environment and includes the following data points in FIG. 3:

| Light Wavelength (nm) | % Light Transmitted |
| --- | --- |
| below 400 | 0 |
| 400 | 0 |
| 410 | 2 |
| 420 | 5 |
| 430 | 6 |
| 440 | 8 |
| 460 | 4 |
| 470 | 3 |
| 500 | 2 |
| 520 | 5 |
| 540 | 8 |
| 560 | 14 |
| 600 | 28 |
| 650 | 32 |
| 700 | 32 |

The curve identified by reference numeral 24 also filters light in the same spectral proportions but according to a 40% light transmission ratio for optimal use around dusk or sunrise. This curve includes the following data points in FIG. 3:

| Light Wavelength (nm) | % Light Transmitted |
| --- | --- |
| below 400 | 0 |
| 400 | 1 |
| 410 | 5 |
| 420 | 12 |
| 430 | 16 |
| 440 | 19 |
| 460 | 11 |
| 470 | 7 |
| 500 | 5 |
| 520 | 12 |
| 540 | 21 |
| 560 | 36 |
| 600 | 70 |
| 650 | 80 |
| 700 | 80 |

Making more particular reference to the preferred spectral transmission curve 20 (FIG. 3), all ultraviolet wavelengths (e.g. wavelengths less than 400 nm) are blocked by the spectral filter. Blocking UV wavelengths is desirable in that it is generally believed that ultraviolet light is harmful to the human body and may contribute to the formation of skin cancers. The human eye is particularly sensitive to harmful UV light. The spectral filter also filters out most wavelengths of light associated with the color blue. This is because blue light has the shortest wavelengths of visible light and scatters in the atmosphere. The scattered light reduces sharpness. The spectral curve, however, shows a peak at about 435 nm because this wavelength corresponds to the peak absorbency of blue-sensitive pigment in the cones of the human eye. The cones of the human eye are sensitive to color and detail. Other wavelengths of light are allowed to pass through the filter at much higher transmission percentages. Therefore, the spectral transmission curve blocks harmful wavelengths of light while allowing sufficient amounts of predetermined wavelengths that are conducive to reading in a sunlit environment.

Figure 4:
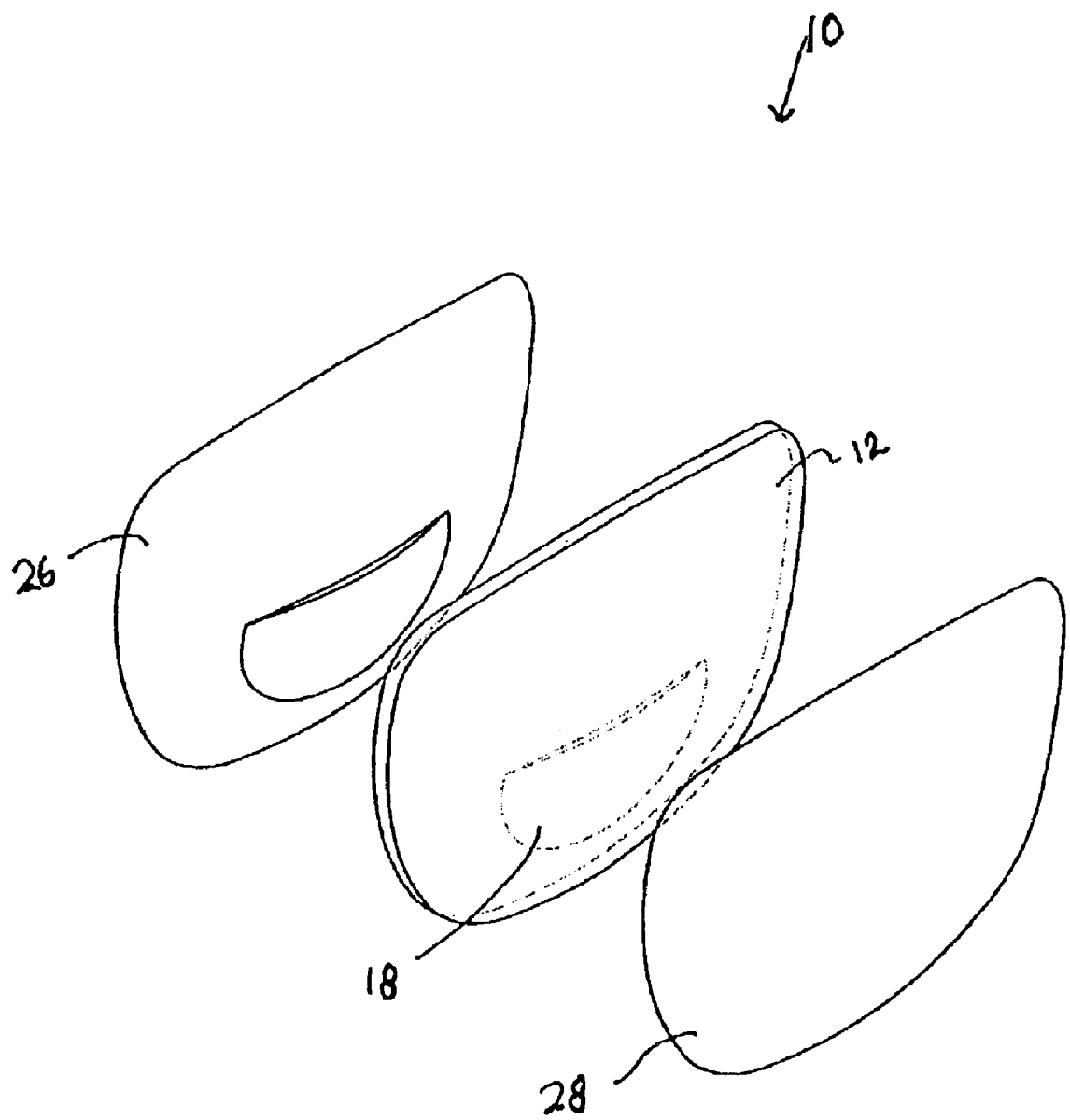
FIG. 4 is an exploded view of the lens as in FIG. 1.

The present invention recognizes that an optimal environment for reading in sunlight conditions should minimize undesirable glare characteristics. One source of glare is light that enters from the sides of a pair of glasses or sunglasses and reflects on the inner surface of the lenses. To inhibit such a reflection, each lens 10 includes an anti-reflection coating 26 (FIG. 4). Another source of glare is light reflecting vertically off of horizontal surfaces, such as roads, water, or the like. To inhibit reflections from horizontal surfaces, each lens 10 includes a polarized filter 28. It should be appreciated that having readers with these glare inhibiting characteristics has great utility as many people desire to read while relaxing by the pool or at a beach.

In use, a user may wear a pair of sunglasses 8 that include a pair of lenses 10 according to the present invention. With these lenses, a predetermined amount of sunlight is blocked so as to lower the overall intensity of the sunlight. In addition glare from horizontal surface reflections or inner lens surface reflections are inhibited. All ultraviolet wavelengths of light are blocked while only an optimal proportion of blue light wavelengths are allowed to pass through the lens according to the spectral filter. The magnification portion 18 of each lens 10 appropriately refracts images such that a user may read a book or other reading material.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A transparent reading lens for blocking predetermined wavelengths and glare characteristics of light that are not conducive to optimal reading conditions in a sunlit environment, comprising:

a substantially transparent optical element having a predetermined light-refracting curvature for refracting impinging light, said optical element having a spectral filter for passing impinging light wavelengths according to a spectral transmission curve as follows:

| Light Wavelength (nm) | % Light Transmitted |
|---|---|
| below 400 | 0 |
| 400 | 1 |
| 410 | 5 |
| 420 | 12 |
| 430 | 16 |
| 440 | 19 |
| 460 | 11 |
| 470 | 7 |
| 500 | 5 |
| 520 | 12 |
| 540 | 21 |
| 560 | 36 |
| 600 | 70 |
| 650 | 80 |
| 700 | 80. |

2. The reading lens as in claim 1 wherein said optical element is adapted to be held by a lens frame of a pair of sunglasses.

3. The reading lens as in claim 1 wherein said optical element defines a diopter between about 1.00 and about 5.00, whereby to magnify the impinging light.

4. The reading lens as in claim 1 wherein said optical element is constructed of optical glass having a substantially constant light transmission ratio throughout.

5. The reading lens as in claim 1 wherein said optical element is constructed of optical plastic having a substantially constant light transmission ratio throughout.

6. The reading lens as in claim 1 wherein said optical element includes a light transmission ratio having a gradient distribution such that a greater amount of impinging light is blocked adjacent an upper edge of said optical element than adjacent a lower edge thereof.

7. The reading lens as in claim 1 wherein only a portion of said optical element includes said predetermined light-refracting curvature.

8. The reading lens as in claim 1 wherein said optical element includes a polarized filter for inhibiting light reflecting off of a horizontal surface.

9. The reading lens as in claim 1 wherein said optical element includes an anti-reflective coating for inhibiting light from reflecting on an inner surface of said optical element.

10. A transparent reading lens for blocking predetermined wavelengths and glare characteristics of light that are not conducive to optimal reading conditions in a sunlit environment, comprising:

a substantially transparent optical element having a predetermined light-refracting curvature for refracting impinging light, said optical element adapted to be held by a lens frame of a sunglasses apparatus;

said optical element having a polarized filter for inhibiting light reflecting off of a horizontal surface;

said optical element having an anti-reflective coating for inhibiting light from reflecting on an inner surface of said optical element; and said optical element having a spectral filter for passing impinging light wavelengths according to a spectral transmission curve as follows:

| Light Wavelength (nm) | % Light Transmitted |
|---|---|
| below 400 | 0 |
| 400 | 1 |
| 410 | 3 |
| 420 | 7 |
| 430 | 10 |
| 440 | 11 |
| 460 | 7 |
| 470 | 4 |
| 500 | 3 |
| 520 | 7 |
| 540 | 13 |
| 560 | 22 |
| 600 | 42 |
| 650 | 48 |
| 700 | 48 |

11. The reading lens as in claim 10 wherein said optical clement defines a diopter between about 1.00 and about 4.00.

12. The reading lens as in claim 10 wherein said optical element is constructed of optical glass having a substantially constant light transmission ratio throughout.

13. The reading lens as in claim 10 wherein said optical element is constructed of optical plastic having a substantially constant light transmission ratio throughout.

14. The reading lens as in claim 10 wherein said optical element includes a light transmission ratio having a gradient distribution such that a greater amount of impinging light is blocked adjacent an upper edge of said optical element than adjacent a lower edge thereof.

15. The reading lens as in claim 10 wherein only a portion of said optical element includes said predetermined light-refracting curvature.

16. A transparent reading lens for blocking predetermined wavelengths and glare characteristics of light that are not conducive to optimal reading conditions in a sunlit environment, comprising:

a substantially transparent optical element to be held by a lens frame of a sunglasses apparatus, said optical element including a magnification portion having a predetermined vision corrective light-refracting curvature;

wherein said optical element includes a light transmission ratio having a gradient distribution such that a greater amount of impinging light is blocked adjacent an upper edge of said optical element than adjacent a lower edge thereof; and wherein said optical element includes a spectral filter for passing impinging light wavelengths according to a spectral transmission curve as follows:

| Light Wavelength (nm) | % Light Transmitted |
|---|---|
| below 400 | 0 |
| 400 | 1 |

-continued

| Light Wavelength (nm) | % Light Transmitted |
|---|---|
| 410 | 3 |
| 420 | 7 |
| 430 | 10 |
| 440 | 11 |
| 460 | 7 |
| 470 | 4 |
| 500 | 3 |
| 520 | 7 |
| 540 | 13 |
| 560 | 22 |
| 600 | 42 |
| 650 | 48 |
| 700 | 48 |

17. The reading lens as in claim 16 wherein said magnification portion of said optical element defines a diopter between about 1.00 and about 4.00.

18. The reading lens as in claim 16 wherein said optical element includes a polarized filter for inhibiting light reflecting off of a horizontal surface.

19. The reading lens as in claim 18 wherein said optical element includes an anti-reflective coating for inhibiting light from reflecting on an inner surface of said optical element.

20. The reading lens as in claim 16 wherein said optical element includes an anti-reflective coating for inhibiting light from reflecting on an inner surface of said optical element.

* * * * *